United States Patent

Morbitzer

[11] Patent Number: 6,007,327
[45] Date of Patent: Dec. 28, 1999

[54] COMBINED TEMPERATURE LIMITER AND IGNITER

[75] Inventor: Hans-Peter Morbitzer, Langenlebarn, Austria

[73] Assignee: Electrovac, Fabrikation elektrotechnischer Spezial-artikel Gesellschaft m.b.H., Klosterneuburg, Austria

[21] Appl. No.: 08/902,296

[22] Filed: Jul. 29, 1997

[30] Foreign Application Priority Data

Jul. 30, 1996 [AT] Austria ................................ 1361/96

[51] Int. Cl.[6] .................................................. F23N 5/00
[52] U.S. Cl. ........................... 431/75; 431/74; 431/258; 126/39 G; 126/39 H; 126/39 BA; 371/394; 371/123; 361/266
[58] Field of Search .................. 431/75, 74, 77, 431/85, 83, 313, 315, 258, 262, 264, 265, 266; 236/9 R, 9 A, 15 A, 15 BB; 374/141, 144; 126/39 G, 39 H, 39 J, 39 BA; 337/394, 397, 123; 361/266; 219/267

[56] References Cited

U.S. PATENT DOCUMENTS

| | | |
|---|---|---|
| 2,448,497 | 8/1948 | Rosche ...................................... 431/75 |
| 2,487,754 | 11/1949 | Cohn ........................................ 431/258 |
| 2,642,309 | 6/1953 | Wasser .................................. 126/39 G |
| 2,874,762 | 2/1959 | Dunstan ..................................... 431/75 |
| 3,123,300 | 3/1964 | Goch et al. .............................. 337/394 |
| 3,372,305 | 3/1968 | Mikulec ................................... 219/267 |
| 3,922,528 | 11/1975 | Nickmeyer et al. ..................... 227/394 |
| 4,243,874 | 1/1981 | Fischer .................................... 219/467 |
| 4,267,815 | 5/1981 | Gössler .................................. 126/39 G |
| 4,435,150 | 3/1984 | Rippelmeyer ............................. 431/75 |
| 4,711,629 | 12/1987 | MacDonald ............................. 431/264 |
| 4,760,836 | 8/1988 | Witzel ..................................... 431/264 |
| 4,846,671 | 7/1989 | Kwiatek .................................. 431/264 |
| 4,901,049 | 2/1990 | Kicherer et al. ........................ 337/394 |
| 5,113,170 | 5/1992 | Goessler et al. ........................ 337/394 |
| 5,275,551 | 1/1994 | Ejiri et al. ............................... 431/264 |
| 5,556,272 | 9/1996 | Blasko et al. ............................. 431/75 |
| 5,669,714 | 9/1997 | Runne ..................................... 374/144 |
| 5,787,874 | 8/1998 | Krohn et al. .............................. 431/74 |

Primary Examiner—Ira S. Lazarus
Assistant Examiner—Josiah C. Cocks
Attorney, Agent, or Firm—Henry M. Feiereisen

[57] ABSTRACT

Apparatus for controlling the temperature of a cooking location of a cooking unit includes a temperature sensor having an outer tube and an inner rod received within the tube and having a different coefficient of expansion, a switch base operatively connected to the temperature sensor and carrying electric contacts actuated by the temperature sensor, and an igniter connected to the temperature sensor and/or switch base.

18 Claims, 4 Drawing Sheets

COMBINED TEMPERATURE LIMITER AND IGNITER

BACKGROUND OF THE INVENTION

The present invention refers to an apparatus for controlling the temperature of a cooking location of a cooking unit. More specifically, the present invention refers to a temperature limiter of a type having a temperature sensor including an outer tube and an inner rod accommodated in the outer tube and having a different coefficient of expansion, and a switch base connected to the temperature sensor and carrying contacts actuated by the temperature sensor.

Cooking units or cooktops have typically one or more cooking locations which serve as placement area for cooking utensils and are formed by a plate of ceramic glass and an underlying housing which defines with the plate a heating chamber. Such cooking locations can be heated in a wide variety of ways, e.g. by electric thermal resistors, halogen lights, gas or the like. Regardless of the type of heating element, overheating should be avoided to prevent a destruction of the glass ceramic plate. Typically, temperature limiters are employed to control and limit the temperature of the cooking location.

When using gas to heat the cooking location, it is necessary to provide within the heating chamber a gas igniter in addition to the temperature limiter. Thus, the housing wall must be formed with a passageway for the temperature sensor of the temperature limiter and with a passageway for the igniter so as to be disposed in the heating chamber, and moreover, when assembling the cooking location, both these structural components must be installed separately from one another, rendering the construction relative complicated and the overall assembly time-consuming.

SUMMARY OF THE INVENTION

It is thus an object of the present invention to provide an improved apparatus for controlling the temperature of a cooking location of a cooking unit, obviating the aforestated drawbacks.

In particular, it is an object of the present invention to provide an improved apparatus for controlling the temperature of a cooking location of a cooking unit, allowing a simplified assembly of temperature limiter and ignition element.

These objects and others which will become apparent hereinafter are attained in accordance with the present invention by providing an ignition element which is connected to the temperature sensor and/or the switch base.

In this manner, the temperature limiter and the igniter form a structural unit that is easy to handle and easy to install in the heating chamber of the cooking location. The structural unit of the temperature limiter and igniter is secured to the switch base, whereby the temperature sensor and the igniter may be positioned in side-by-side relationship, or preferably in coaxial alignment.

According to another feature of the present invention, the igniter circumscribes, preferably concentrically, the temperature sensor to thereby effect a very compact combination of temperature sensor and igniter that requires only a single passageway in the housing wall of the heating chamber.

Preferably, the igniter is formed by an electric thermal resistor which is mounted upon a support body. As materials for the electric thermal resistor typically exhibit only a low mechanical strength, the provision of a support body counters this detrimental property and affords the igniter with a sufficient strength. Suitably, the electric thermal resistor may be formed as a spiral, preferably a double-threaded spiral. Such a configuration results in a small overall size and a large surface area, enabling a reliable ignition of the gas. Suitably, the support body extends substantially along a longitudinal axis of the thermal resistor, thereby effecting a particularly small need for space for the support body and the thermal resistor.

According to still another feature of the present invention, the support body exhibits a tubular configuration, with the rod of the temperature sensor extending through the support body. Thus, the sensor tube and the tubular support body are disposed behind one another so that the configuration of the temperature limiter according to the present invention deviates only slightly from conventional temperature limiters, and thus can be manipulated and installed in cooking locations in a similar manner.

Preferably, the support body is arranged between the switch base and the tube of the temperature sensor. Thus, the igniter is in immediate proximity to the switch base so that the electric feeder cables to the igniter can be kept short and guided completely outside the heating chamber.

According to yet another feature of the present invention, the igniter is formed by two or more electrodes in spaced-apart disposition and electrically connectable to a high-voltage source. Preferably, the electrodes have one end spaced from one another by a gas-filled gap within the heating chamber of the cooking location. In this manner, gas may be ignited by means of an electrical spark.

According to a further feature of the present invention, the electrodes are of hollow cylindrical configuration and extend in longitudinal direction of the temperature sensor, with a first cylindrical insulator being positioned between the electrodes and with a second cylindrical insulator being positioned within the inner one of the electrodes. Such a configuration eliminates the risk of a flashover of the high voltage toward a different location other than in the heating chamber.

Suitably, the second insulator at least partially receives the rod and has one end supporting the tube. This ensures a sufficient insulation of the temperature limiter according to the present invention also in the area of the temperature sensor.

In order to increase the ignition tendency when applying high voltage upon the electrodes, the outer one of the electrodes is formed in staggered disposition with circumferentially spaced projections.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
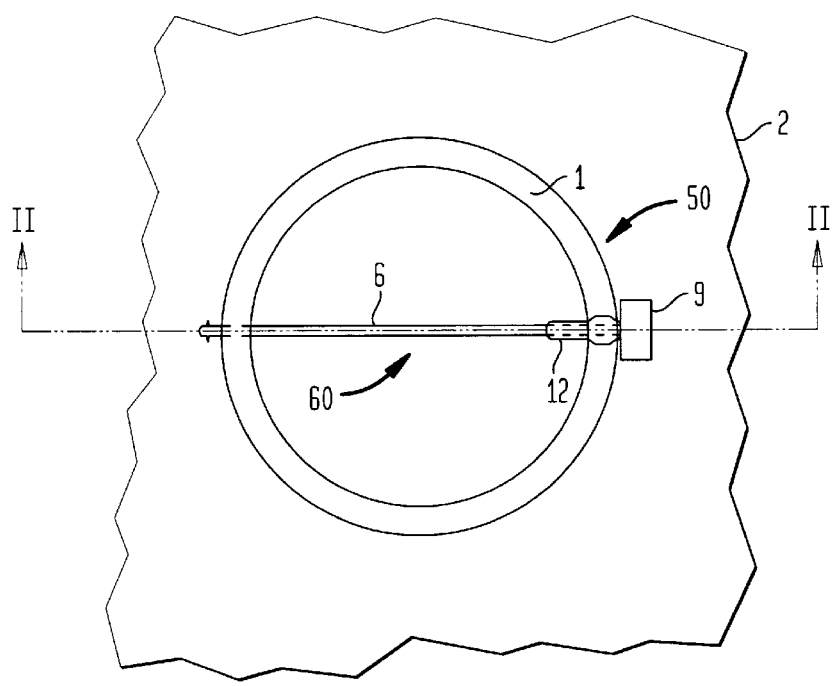
FIG. 1 is a fragmentary plan view of a cooking unit provided with a cooking location having incorporated therein a schematically shown combined temperature limiter and ignition element, in accordance with the present invention.

Throughout all the Figures, the same or corresponding elements are generally indicated by the same reference numerals.

Figure 2:
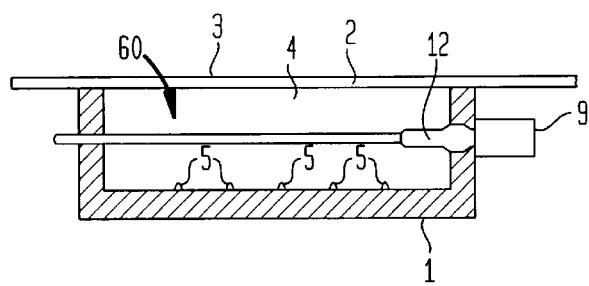
FIG. 2 is a sectional view of the cooking location, taken along the line II—II in FIG. 1.

Turning now to the drawing, and in particular to FIG. 1, there is shown a fragmentary plan view of a cook unit 2 which has a cooktop in form of a flat plate 3 of metal, ceramic glass (cerane) or a material capable of withstanding high temperatures. The plate 3 is provided with a gas-heated cooking location, generally indicated by reference numeral 50 and having a housing 1 which is made of insulating material and secured with its rim to the underside of the plate 3 so as to define together with the plate 3 a heating chamber 4, as shown in FIG. 2. In the heating chamber 4, there are provided in a conventional manner nozzles 5, porous mats, plates or the like for supply of burnable gas. Incorporated in the cooking location 50 within the heating chamber 4 is a temperature limiter, generally designated by reference numeral 60 for preventing overheating and combined to a structural unit with an ignition element or igniter, generally designated by reference numeral 12. The operation of the igniter 12 is generally known and can be effected in a wide variety of ways, as will be described in more detail with reference to FIGS. 4–7.

As shown in FIG. 1, the temperature limiter 60 includes a temperature sensor 6 and a switch base 9, with the temperature sensor 6 and the igniter 12 being so positioned as to be in coaxial alignment and secured together as a single structural unit to the switch base 9 which is positioned outside the housing 1 and responds to an output of the temperature sensor 6 by reducing the heating capacity when a maximum permissible temperature is reached through throttling of the gas supply in the event a gas-operated cooking location 50 is involved here. In the configuration of the cooking location 50 shown in FIG. 3, the temperature sensor 6 and the igniter 12 are united to a structural unit in side-by-side disposition for common securement to the switch base 9. However, this configuration requires the formation of two passageways in the housing 1 for accommodation of the temperature sensor 6 and the igniter 12.

Figure 3:
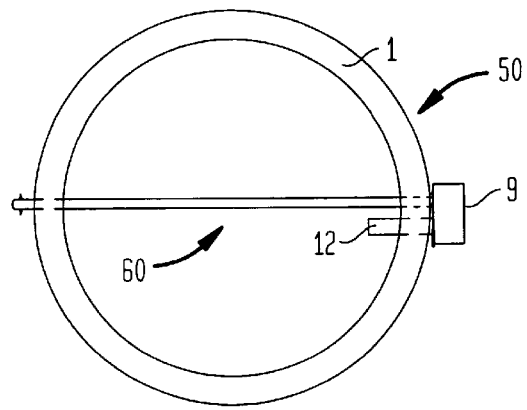
FIG. 3 is a schematic plan view of a variation of a combined temperature limiter and ignition element incorporated in the cooking location.

As described above, the igniter 12 forms with the temperature limiter 60 a structural unit which is secured to the switch base 9, whereby the temperature sensor 6 and the igniter 12 may be positioned in side-by-side relationship, as shown in FIG. 3, or preferably in coaxial alignment, as shown in FIG. 1.

Figure 4:
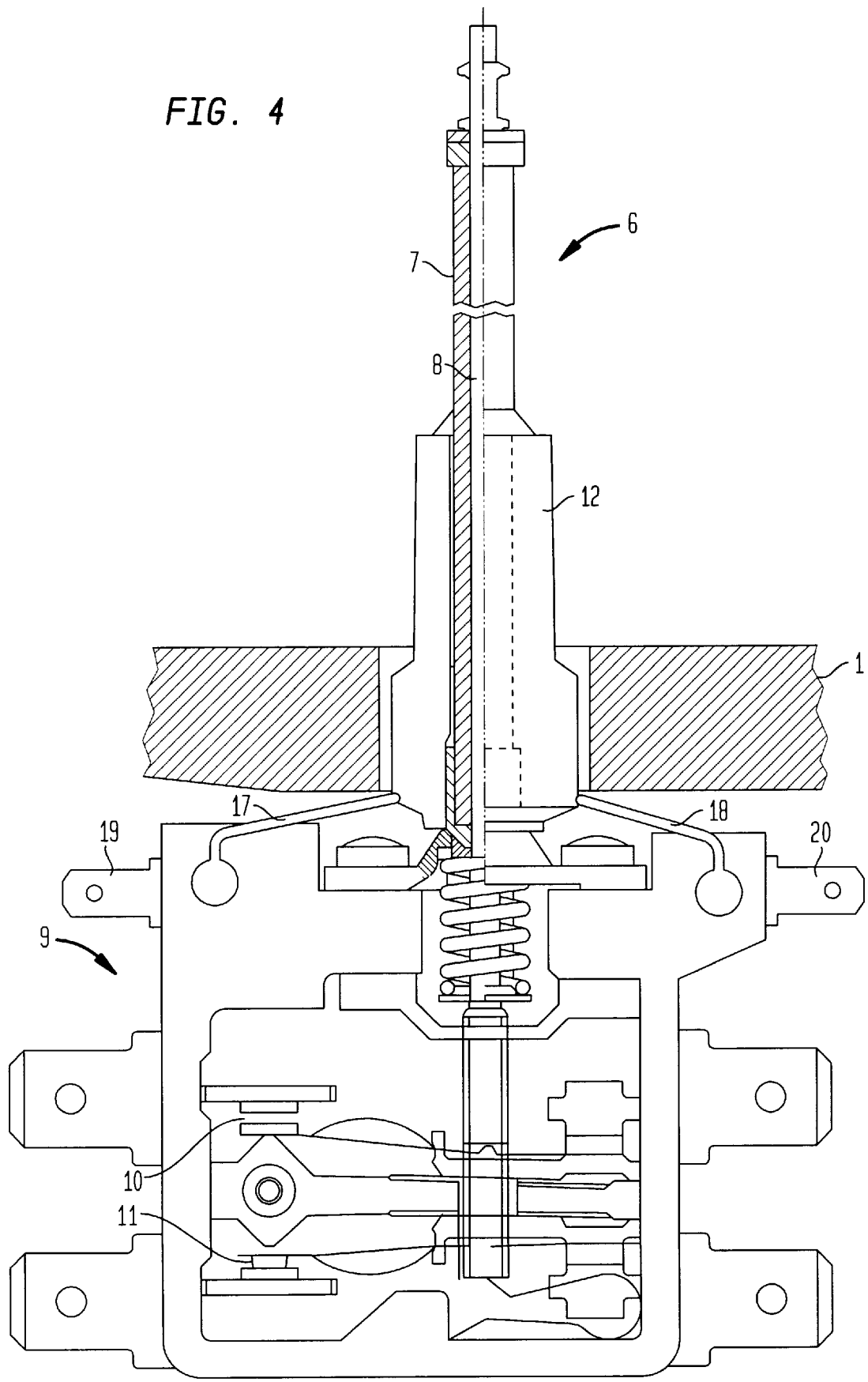
FIG. 4 is a detailed, partially sectional view of one embodiment of a combined temperature limiter and ignition element according to the present invention, incorporated in the cooking location.

Turning now to FIG. 4, there is shown a detailed, partially sectional view of one embodiment of a combined temperature limiter 60 and igniter 12 as incorporated in the cooking location 50. The temperature sensor 6 of the temperature limiter 60 is formed by an outer tube 7 which accommodates in its interior an inner rod 8. The tube 7 and the rod 8 are made of different materials to exhibit different coefficients of thermal expansion so that the expansion of the tube 7 and the rod 8 varies during heating to thereby effect a relative movement of their ends. This relative movement is exploited to actuate contacts 10, 11 provided in the switch base 9, so as to reduce the heating capacity when a preset maximum temperature is reached. The general mode of operation of a temperature limiter is known and is not described herein for sake of simplicity.

Figure 5:
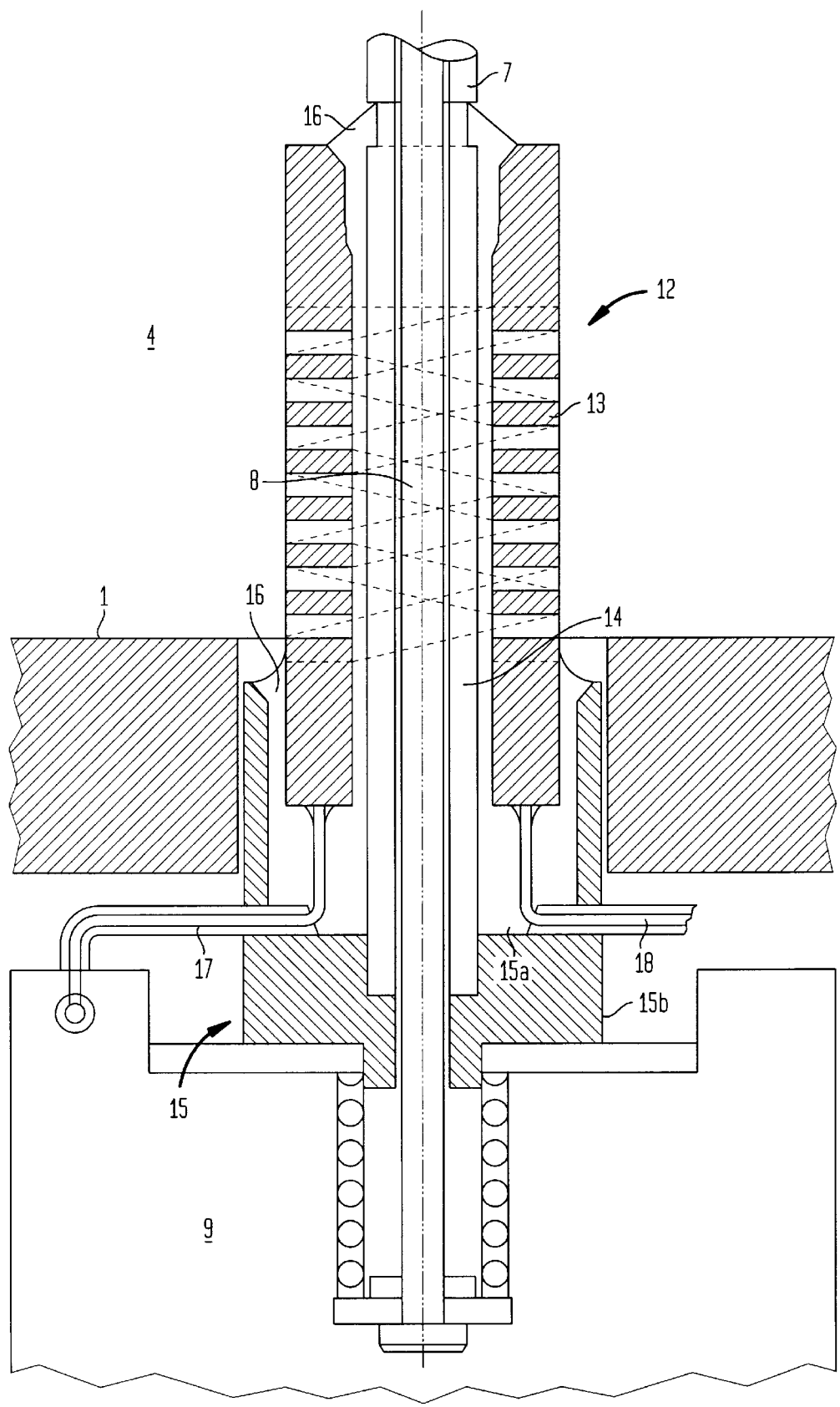
FIG. 5 is a partially sectional view of the ignition element of FIG. 4.

As shown in FIG. 5, the igniter 12 is formed by an electric thermal resistor 13 which is subject to relatively high temperatures and to relatively frequent temperature fluctuations. Typically, materials that are temperature-resistant, such as SiC or other materials that exhibit equivalent electric and thermal properties, have been used for making the thermal resistor 13 to prevent excessive wear or rupture as a consequence of these strains. However, these materials are rather brittle. Thus, in order to prevent the thermal resistor 13 from cracking as a result of mechanical stress created by vibrations, impacts or the like, the thermal resistor 13 is secured upon a support body 14 which is preferably made of ceramic material.

The thermal resistor 13 is formed as a spiral, preferably a double-threaded spiral in order to effect a greatest possible surface area while still exhibiting small overall dimensions, with the support body 14 being arranged interiorly substantially along the longitudinal axis of the spiral-type thermal resistor 13.

In order to effect a coaxial alignment of the structural unit of the temperature limiter 60 and the igniter 12, the support body 14 is formed as a tube, with the rod 8 extending through the tubular support body 14. Thus, the tube 7 and the support body 14 are positioned, as viewed in longitudinal direction of the rod 8, in alignment behind one another so that the housing 1 requires the formation of only a single passageway for accommodation of the combined temperature sensor 6 and igniter 12.

The igniter 12 is retained in a pot-shaped metallic mounting, generally designated by reference numeral 15 and secured directly upon the switch base 9. The mounting 15 defines an interior space 15a and has a bottom 15b which is formed with a central recess for receiving one end of the support body 14. The spiral-type thermal resistor 13 projects with its one end into the interior space 15a and is cemented therein together with the mounting 15 and the support body 14 by a potting material 16. The other end of the thermal resistor 13 is also cemented together with the support body 14 by a potting material 16. The current feeder lines 17, 18 for the thermal resistor 13 are routed through the potting material 16 and the mounting 15 and connected to terminal lugs 19, 20 secured on the switch base 9.

In the configuration of FIG. 5, the support body 14 is positioned between the switch base 9 and the tube 7 of the temperature sensor 6. Persons skilled in the art will understand however that it is equally possible to position the tube 7 between the switch base 9 and the support body 14, or even to divide the tube 7 so as to form a configuration of switch base 9-tube 7-support body 14-tube 7.

Figure 6:
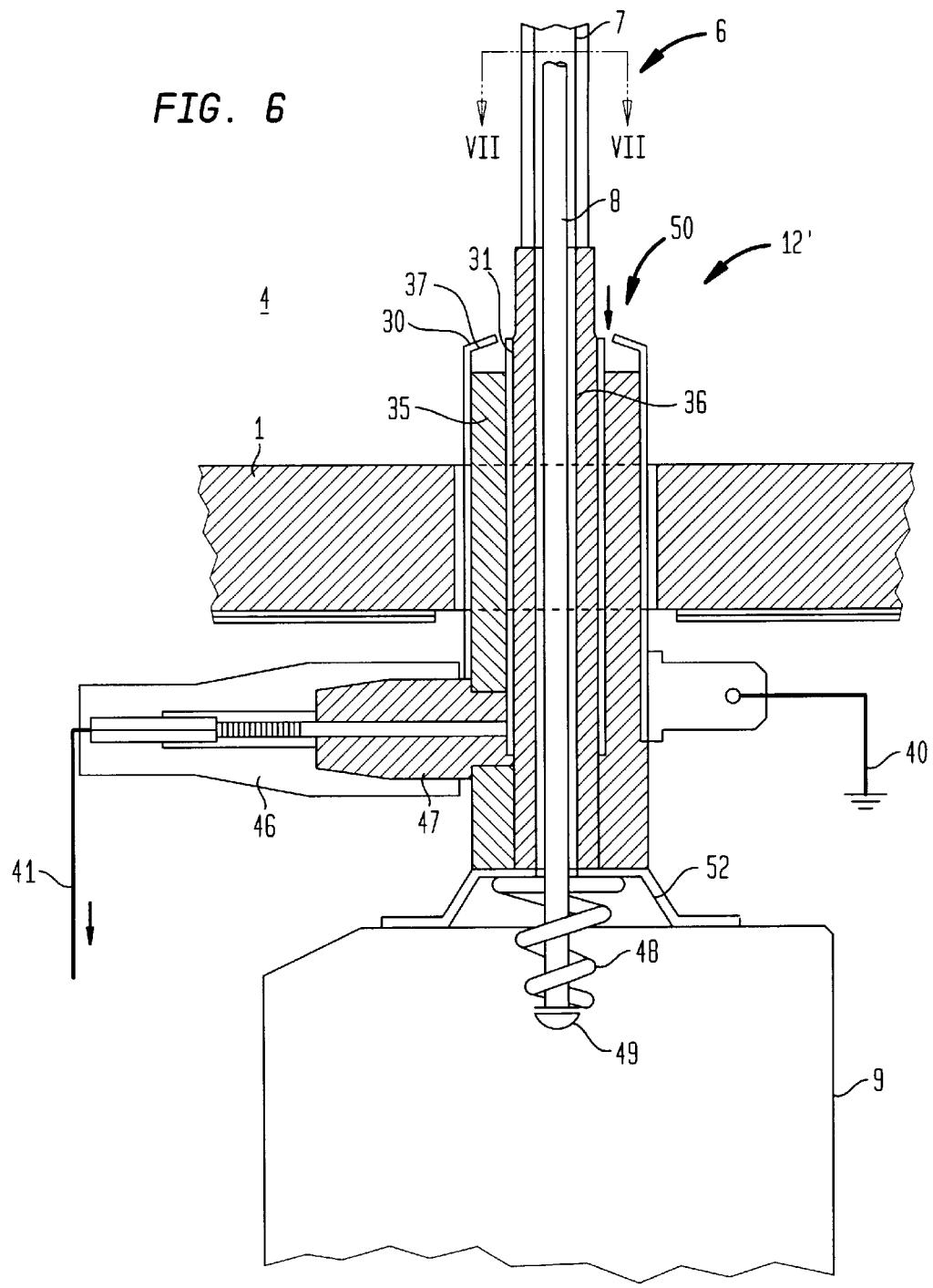
FIG. 6 is a detailed, partially sectional view of another embodiment of a combined temperature limiter and ignition element according to the present invention, incorporated in the cooking location.

Turning now to FIG. 6, there is shown a detailed, partially sectional view of another embodiment of a structural unit combining the temperature limiter 60 with an igniter 12' in the form of a spark plug. The temperature sensor 6 includes a spiral spring 48 by which the rod 8 is biased against the tube 7 and expands in longitudinal direction during a temperature increase for actuation of a contact mechanism (not shown) within the switch base 9 via a switch button 49 for control of the heating capacity. The igniter 12' is positioned concentrically about the temperature sensor 6 and formed by outer and inner hollow-cylindrical electrodes 30, 31 which are spaced from one another by an interposed ring cylinder 35 of electrically insulating material. The electrodes 30, 31 are separated from one another at their upper ends within the heating chamber 4 by a gas-filled gap so as to ignite the gas through generation of a spark.

Figure 7:
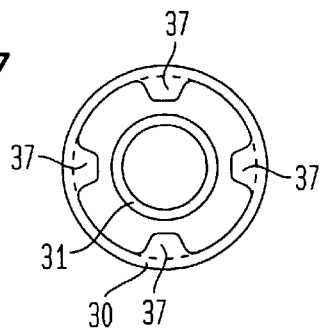
FIG. 7 is a partial plan view of the combined temperature limiter and ignition element, taken in direction of arrow VII in FIG. 6.

As shown in FIG. 7, the outer electrode 30 is formed with a plurality of projections 37 spaced evenly at a same angular distance about the circumference of the electrode 30 for reducing the distance to the inner electrode 31. Thus, the field intensity in the air-filled or gas-filled gap between the electrodes 30, 31 is increased so that an arc or ignition spark is formed only in these areas. A spark is generated by electrically connecting a not shown high-voltage source to the inner electrode 31 via a line 41 and to the outer electrode 30 via a line 40 which is grounded at the same time and effects ignition of the gas flowing into the heating chamber 4.

In order to prevent a flashover of high voltage in direction of the expansion rod 8, an additional cylindrical insulator 36 is incorporated within the inner electrode 31 in direction of its longitudinal axis and receives in its interior the expansion rod 8. One end of the insulator 36 is mounted to a support platform 52 of the switch base 9, and the other end of the insulator 36 is supported by the opposing end of the tube 7.

The components conducting the high voltage are suitably insulated in the lower region of the temperature sensor 6 by insulating elements 46, 47 to prevent flashover. Also, the housing 1 which is formed with the passageway for the temperature sensor 6 is suitably insulated against high voltage.

While the invention has been illustrated and described as embodied in a combined temperature limiter and igniter, it is not intended to be limited to the details shown since various modifications and structural changes may be made without departing in any way from the spirit of the present invention.

What is claimed as new and desired to be protected by Letters Patent is set forth in the appended claims:

1. Apparatus for controlling the temperature of a gas-heated cooking location of a cooking unit; comprising:

a temperature sensor including an outer tube and an inner rod received within the tube, said tube and said rod having different coefficients of thermal expansion;

a switch base operatively connected to the temperature sensor and carrying electric contacts actuated by the temperature sensor; and an igniter connected to one of the elements selected from the group consisting of temperature sensor and switch base, said igniter circumscribing the temperature sensor.

2. The apparatus of claim 1 wherein the igniter concentrically circumscribes the temperature sensor.

3. The apparatus of claim 1 wherein the igniter is formed by an electric thermal resistor.

4. The apparatus of claim 3, and further comprising a support body, said electric thermal resistor being mounted on the support body.

5. The apparatus of claim 3 wherein the electric thermal resistor is provided in the form of a spiral.

6. The apparatus of claim 5 wherein the electric thermal resistor is provided in the form of a double-threaded spiral.

7. The apparatus of claim 4 wherein the support body extends substantially along a longitudinal axis of the thermal resistor.

8. The apparatus of claim 4 wherein the support body exhibits a tubular configuration, with the rod of the temperature sensor extending through the support body.

9. The apparatus of claim 8 wherein the support body is arranged between the switch base and the tube of the temperature sensor.

10. The apparatus of claim 1 wherein the igniter is formed by at least two electrodes in spaced-apart disposition and electrically connectable to a high-voltage source.

11. The apparatus of claim 10 wherein the electrodes have ends spaced from one another by a gas-filled gap within a heating chamber of a cooking location.

12. The apparatus of claim 11 wherein the electrodes are of hollow cylindrical configuration and are so disposed as to form an inner electrode and an outer electrode which extend in longitudinal direction of the temperature sensor, with a first cylindrical insulator being positioned between the electrodes and with a second cylindrical insulator being positioned within the inner electrode.

13. The apparatus of claim 12 wherein the second insulator has an interior space for at least partially receiving the rod and defines one end supporting the tube.

14. The apparatus of claim 12 wherein the outer electrode is formed with circumferentially spaced projections.

15. Apparatus for controlling the temperature of a cooking location of a cooking unit; comprising:

a temperature sensor including an outer tube and an inner rod received within the tube, said tube and said rod having different coefficients of thermal expansion;

a switch base operatively connected to the temperature sensor and carrying electric contacts actuated by the temperature sensor; and an igniter in the form of an electric thermal resistor circumscribing the temperature sensor and connected to one of the elements selected from the group consisting of temperature sensor and switch base.

16. The apparatus of claim 15 wherein the electric thermal resistor concentrically circumscribes the temperature sensor.

17. Apparatus for controlling the temperature of a cooking location of a cooking unit; comprising:

a temperature sensor including an outer tube and an inner rod received within the tube, said tube and said rod having different coefficients of thermal expansion;

a switch base operatively connected to the temperature sensor and carrying electric contacts actuated by the temperature sensor; and an igniter in the form of at least two electrodes in spaced-apart disposition and circumscribing the temperature sensor, said electrodes being electrically connectable to a high-voltage source.

18. The apparatus of claim 17 wherein the electrodes concentrically circumscribe the temperature sensor.

* * * * *